April 16, 1935.   L. W. CHUBB   1,997,628

MODULATION OF LIGHT BEAMS

Filed July 26, 1933

INVENTOR
Lewis W. Chubb.

Patented Apr. 16, 1935

1,997,628

UNITED STATES PATENT OFFICE 1,997,628

MODULATION OF LIGHT BEAMS

Lewis W. Chubb, Pittsburgh, Pa., assignor to Westinghouse Electric & Manufacturing Company, East Pittsburgh, Pa., a corporation of Pennsylvania Application July 26, 1933, Serial No. 682,282

7 Claims. (Cl. 250—7)

This invention relates to signalling by means of light and particularly to preserving secrecy of the signals thus conveyed.

It is an object of my invention to provide a system of signalling in which the signals are translated into movements of the plane of polarization of a beam of polarized light.

It is a further object of my invention to control the position of the plane of polarization by movement of a sheet of optically active material.

It is a further object of my invention to provide a means for controlling the position of the plane of polarization by means capable of being operated by sound.

It is a further object of my invention to provide a sheet of optically active material for the purpose just indicated which shall have so small an inertia that the necessary movements may be effected by the energy of a sound.

It is a further object of my invention to take advantage of the optical properties of cellulose film.

It is a further object of my invention to so provide for a movement of two sheets of cellulose film that their azimuths relative to each other and to the plane of polarization of the light shall be changed by a sound-operated moving device.

Figure 1:
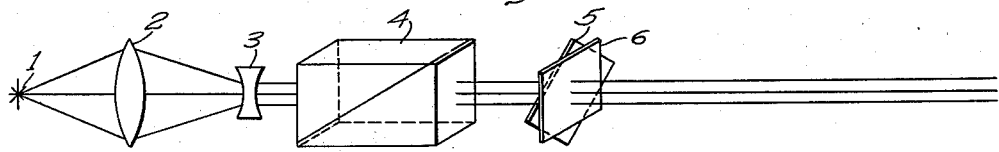
Figure 2:
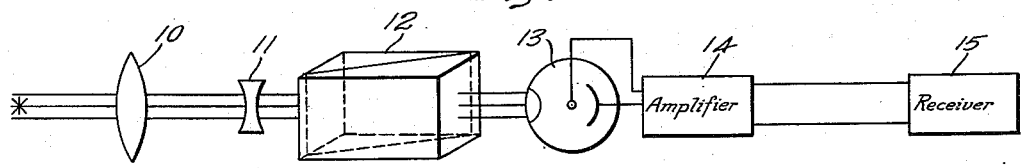
Figure 3:
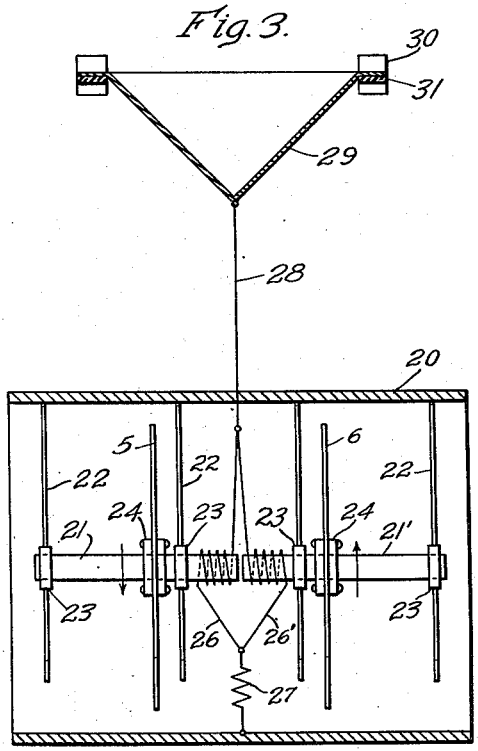
Figure 4:
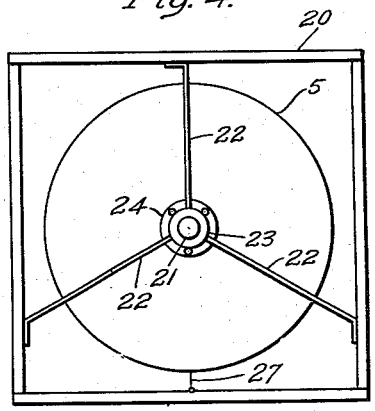

Other objects of my invention and details of the arrangement of the apparatus will be understood from the following description and the accompanying drawing in which:

Figure 1 is a diagrammatic view indicating the arrangement of the apparatus at the sending station, Fig. 2 is a similar view for the receiving station, Fig. 3 is a partly sectional and partly diagrammatic view of one form of mechanical arrangement which may be used for moving the sheets of cellulose film, and Fig. 4 is an end view of the principal part of Fig. 3.

In Fig. 1, the reference numeral 1 is any convenient source of light. An optical system which is indicated by a convex lens 2 and a concave lens 3 concentrates the light into a parallel beam which enters the Nicol prism 4. The light which emerges from the Nicol prism passes through two sheets 5 and 6 of cellulose film. Cellulose film is a well-known form of regenerated cellulose. It is a birefringent material, having two principal sections at right angles to one another. One principal section is in the direction of movement of the sheet during its manufacture and the other is at right angles thereto.

The sheets 5 and 6 are so arranged that the principal sections of one sheet are at 45° with those of the other sheet. In Fig. 1, the plane of polarization of the light emerging from the Nicol prism 4 may be assumed to be the plane of the paper and the principal section of each sheet of cellulose film to be parallel responsively to the edges of the rectangular representations of these sheets.

The sheets 5 and 6 are preferably so arranged that for each sheet the extraordinary ray shall fall on opposite sides of the original ray and the ordinary ray shall be on opposite sides of the original ray. The two sheets are preferably parallel to each other and normal to the direction of the light. As shown, they are close to one another but this is not necessary.

The light emerging from the sheets 5 and 6 extends to the receiving station which is shown in Fig. 2. An optical system, including a concentrating lens 10 and a lens 11 for rendering the rays of light parallel, concentrates the received beam upon a Nicol prism 12 placed so that its transparent plane to plane polarized light is at right angles to the like plane of the Nicol prism 4. The prisms 4 and 12 are thus optically crossed. This has been indicated on the drawing by choosing different directions for the diagonal plane representing the Canada balsam in the respective prisms. The light from the Nicol prism 12 is received in a photocell 13 and the current from the photocell, after being amplified as indicated at 14 is delivered to any suitable receiving and translating device 15. Ordinarily, this would include a loud-speaker or other sound-reproducing device.

One proposed mounting for the sheets of cellulose film 5 and 6 is illustrated in Fig. 3. This is by way of illustration only; any suitable design of the mounting of sheets and any suitable means for rotating them in response to sound may be used.

In the form chosen for illustration, the sheets 5 and 6 are mounted upon two shafts 21 and 21', which are supported in the frame 20 by means of braces 22, each brace being equipped with a foot by which it is secured to the frame at its outer end and being joined at its inner end to a collar. Four of these collars 23 are shown. The sheets of cellulose film are secured upon the shafts 21 and 21' by the use of hubs 24, which are secured together, and clasp the cellulose film by rivets, bolts, or any similar provisions.

The shafts 21 and 21' extend through hubs 24, and, therefore, offer no more obstacle to the passage of light from left to right through the frame 20 than is offered by the hubs. The braces 22 are as small as possible, in order that they also may present the least possible shadow. The collars 23 are as small as may be, and provide for mounting the shafts. They can usually be made smaller than the hubs 24 and thus avoid adding to the obstruction of light.

Around the adjacent ends of the shafts 21 and 21', two threads are wound, one in one sense and the other in the opposite sense. These threads 26 and 26' are united together and to a spring 27 by which they are secured to the frame 20. The remaining ends of the threads 26 and 26' are also united together and to a thread 28 by which they are secured to the vertex of a sound cone 29. The cone is mounted in any suitable frame 30 by means of a cushioning ring 31 of rubber or other elastic material.

The ring 31 is so positioned relative to the frame 20 that the thread 28 is under tension. Consequently, the spring 27 is also under tension.

In the operation of the device illustrated in Figs. 3 and 4, when sound is received upon the cone 29, sound pressure will at times cause it to move downward, as represented in Fig. 3, compressing the rubber in the ring 31 and permitting some diminution of the tension of spring 27. This movement causes the thread 26 to rotate the shaft 21 in one sense, and the thread 26' to rotate the shaft 21' in the opposite sense. The two sheets 5 and 6 are thus rotated in opposite senses through a small angle. When sound pressure on the cone 29 diminishes, the cushioning ring 31 returns the cone to or beyond its original position and the spring 27 returns to its original configuration or beyond it. The sheets 5 and 6 are thereby returned to or beyond their original positions.

The operation of the system illustrated in Figs. 1 and 2 is mainly optical. The Nicol prism 4 produces plane polarized light from the ordinary light delivered by the source 1. The plane polarized light impinges upon the sheet 5, and the principal sections in this sheet are at an angle with the plane of polarization.

The light entering the sheet 5, since it is polarized in a plane at an angle to each of the principal sections of the cellulose film, may be considered as having two components, one polarized in one principal section of the cellulose film and one in the other. The index of refraction for cellulose film is different towards these components, being 1.55 in one principal plane and 1.53 in the other. Consequently, a change in relative phase of the components occurs while the light is passing through the cellulose film. With cellulose film of the usual commercial thickness, this amounts to a half wave-length. The light emerging from sheet 5 is, therefore, plane polarized in a plane at right angles to that of the entering light.

When the light from the sheet 5 traverses the sheet 6, it emerges as plane polarized light, with its plane of polarization rotated through another right angle. The plane polarized light emerging from the sheet 6 thus has its plane of polarization coincident with the plane of polarization for the light emerging from the Nicol prism 4.

The beam of light from the sending station to the receiving station is, therefore, plane polarized. To the ordinary observer it would appear as a beam of ordinary light, and even if it were examined with an analyzer like a Nicol prism, the variations in the position of the plane of polarization would be too rapid to be detected by ordinary eyesight. It is, therefore, unlikely that an ordinary observer would discover that the light beam was conveying signals.

The foregoing description applies strictly only if the principal sections of one sheet of cellulose film are at right angles to those of the other and at 45° to the plane of polarization of the incident light, and only if the thickness of each sheet is that corresponding to a phase difference of a half wave-length. When the thickness is not correct, the emerging light will be elliptically polarized, and, when the two sheets do not have their respective principal sections at 45° to the phase of polarization of the light from the Nicol prism 4, the rotation of the plane of the major axis of the ellipse will not be through a true right angle for each sheet of cellulose film. Yet useful results can be obtained with considerable departures from these conditions.

The Nicol prisms 4 and 12 are crossed, but the light emerging from the prism 12 will be zero only if the sheets 5 and 6 are strictly in the 45° position, and if they are of exactly the thickness to produce the half wave-length difference in phase of the light used. These sheets are so positioned by means like that in Fig. 3 or any other suitable means for this purpose that they differ a certain amount from the strict 45° position of the light, therefore, emerging from the analyzer 12.

The intensity of this light varies as the sheets 5 and 6 move, but it is intended that these sheets should never arrive at the true 45° position. The variation in light, therefore, for one sense of movement of the sheets, is all in one sense. The intensity does not pass through a minimum. If the sheets 5 and 6 were permitted to pass through the true 45° position, the light from the Nicol prism 12 would pass through zero or through a minimum, and there would be a reversal of the sense of the change of illumination. The light change would then have a frequency twice that of the movement of the sheets 5 and 6. It is desired to keep the frequency the same.

If the angle of the principal sections of the two sheets of cellulose film be about 22½° with the plane of polarization of the light from the Nicol prism 4, the combined effect of the two sheets will be to produce polarized light which can pass the Nicol prism 12 to an intermediate extent. The illumination from the Nicol prism 12 will, therefore, be quite different from the minimum illumination, but also quite a little less intense than maximum illumination. The advantage of this position is that the change in illumination corresponding to a given small change in the position of the sheets of cellulose film will be greatest. If, on the other hand, the sheets are so placed that the illumination from the Nicol prism 12 is nearly a minimum, the change in illumination with a given small change in the position of the sheets will be small, but the percentage change in illumination will be a maximum. This arrangement may be useful with photo responsive devices responding to percentage change of light rather than actual change of light.

Which of these two positions is most desirable will be dependent upon the nature of the amplifying system associated with the photo-cell.

The light received in the photocell 13 gives rise to currents which change with the frequency of the changing light and, to an extent corresponding to the degree of movement of the sheets 5 and 6. As long as this movement is small the change in light and, therefore, the change in current delivered to the amplifier 14 will be nearly proportional to the amplitude of the movement of sheets 5 and 6. The sounds delivered to the cone 29 will, therefore, be reproduced at the receiver 15 without objectionable distortion.

When the 22½° position described above is chosen, a larger movement of the sheets can be used before the departure from time proportionality becomes objectionable.

If desired, the arrangement may be varied so that, instead of the average light from the Nicol prism 12 being nearly a minimum, a maximum serves as the normal illumination.

An advantageous arrangement can be obtained with cellulose film approximately half the thickness of that which is commonly found in commerce. With film of this thickness, light from the Nicol prism 4 will become circularly polarized upon passing through the sheet 5. The sheet 6 may then advantageously be placed at the receiving station instead of closely adjacent to the sheet 5. When the circularly polarized light passes through the sheet 6, it becomes polarized in a plane at right angles to the plane of polarization from the light of the Nicol prism 4.

The light between the two stations will, therefore, be a beam of substantially circularly polarized light. Such a beam can be recognized as differing from ordinary light only by the use of special apparatus, such, for example, as that proposed for the receiving station. Its polarized character would be more difficult to detect than would that of plane polarized light, and the secrecy of the signal would thus be more assured.

Obviously, one of the sheets may be at the sending station, and the other at the receiving station even when the sheets are of the usual thickness, which produces the half wave-length change in the phase relation of the two rays. Whenever one sheet is at each of the two stations, the apparatus illustrated in Figs. 3 and 4 will have only one sheet of cellulose film. Thus, only one sheet will be rotated, the sheet at the other station remaining stationary.

It is not necessary to confine this apparatus to use with visible light or to monochromatic light. Ultra-violet light or infra-red light can be used, and a greater secrecy of signalling thereby obtained. Moreover, with infra-red light the system is more nearly independent of weather conditions, since ordinarily fogs do not obstruct long wave light to as great an extent. When white light is used color effects are too small to matter.

Photocells more sensitive to red than to violet and others more sensitive to violet than to red are known. By selecting a photocell most sensitive to that wave length for which the sheets are of right thickness to produce the half wave-length phase difference, favorable results can be obtained.

Obviously, other birefringent substances than cellulose film may be used, but the thickness must in each case be chosen with regard to the index of refraction and the wave length of the light chosen.

The apparatus is particularly useful for secret signalling, for example, between ships constituting a fleet. It is also useful for communication between airplanes and between any airplane and a station at a landing field.

Other variations in the arrangement and many details in the construction of the apparatus will be obvious to those skilled in the art. The fact that the apparatus is shown diagrammatically only and that but few arrangements and only a few modifications have been specifically described is not intended as a limitation.

I claim as my invention:

1. In combination, a source of plane polarized light, means for elliptically polarizing said plane polarized light in accordance with signals comprising a sheet of optically active material intercepting said light, said material having a principal section thereof at an oblique angle to the plane of polarization of said light, an analyzer intercepting the light emerging from said sheet, a photo-responsive instrument exposed to the light from said analyzer and signal operated means for changing the azimuth of said sheet relative to said light.

2. In combination, means for elliptically polarizing light in accordance with signals comprising a source of plane polarized light, a sheet of optically active material intercepting said light, said material having a principal section thereof at an oblique angle to the plane of polarization of said light, an analyzer intercepting the light emerging from said sheet, a photo-responsive instrument exposed to the light from said analyzer and signal operated means for changing the azimuth of said sheet relative to said light.

3. In combination, means for elliptically polarizing light in accordance with signals comprising a source of polarized light, a plurality of sheets of optically active material intercepting said light, an analyzer intercepting the light emerging from said sheets, translating means operatively associated with the light from said analyzer, and signal operated means for changing the azimuth of said sheets relative to said light.

4. In combination, means for elliptically polarizing light in accordance with signals comprising a source of polarized light, a plurality of sheets of birefringent material each intercepting said light, an analyzer intercepting the light emerging from said sheets, and signal operated means for changing the azimuth of said sheets relative to said light.

5. In combination, a source of polarized light, a plurality of sheets of birefringent material each intercepting said light with the principal section of each sheet in a different azimuth relative to the plane of polarization of said light, an analyzer intercepting the light, the azimuths of the several sheets being such that the intensity of the light emerging from the analyzer is not at an extreme value, signal controlled means for so moving each sheet that the effect of said movements on said intensity is additive and said movements being so restricted that their combined effect is insufficient to cause said intensity to arrive at an extreme value.

6. In combination, a source of polarized light, a plurality of sheets of birefringent material each intercepting said light with the principal section of each sheet in a different azimuth relative to the plane of polarization of said light, an analyzer intercepting the light, the azimuth of the several sheets being so positioned that the intensity of the light emerging from the analyzer is not at an extreme value, signal controlled means for so moving each sheet that the effect of said movements on said intensity is additive and said movements being so restricted that their combined effect is insufficient to cause said intensity to arrive at said extreme value, and sound-responsive devices for operating said signal-controlled means.

7. In an optical system, a pair of parallel sheets of cellulose film with their principal sections at an angle to each other, means for passing plane polarized light through said sheets and signal controlled means for changing the azimuth of a sheet relative to the plane of polarization of said light, whereby plane polarized light is elliptically polarized in accordance with signals.

LEWIS W. CHUBB.